US010654466B2

(12) United States Patent
Ogawa (10) Patent No.: US 10,654,466 B2
(45) Date of Patent: May 19, 2020

(54) HYBRID VEHICLE

(71) Applicant: Toyota Jidosha Kabushiki Kaisha, Toyota-shi, Aichi-ken (JP)

(72) Inventor: Yuki Ogawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/273,446

(22) Filed: Feb. 12, 2019

(65) Prior Publication Data

US 2019/0248357 A1    Aug. 15, 2019

(30) Foreign Application Priority Data

Feb. 13, 2018  (JP) .................. 2018-023023

(51) Int. Cl.
| | |
|---|---|
| *B60W 10/08* | (2006.01) |
| *B60W 10/26* | (2006.01) |
| *B60W 20/00* | (2016.01) |
| *B60W 30/182* | (2020.01) |
| *B60W 20/13* | (2016.01) |
| *B60K 6/445* | (2007.10) |
| *B60K 1/02* | (2006.01) |
| *B60K 6/28* | (2007.10) |
| *B60K 6/365* | (2007.10) |

(Continued)

(52) U.S. Cl.
CPC ............. *B60W 20/13* (2016.01); *B60K 1/02* (2013.01); *B60K 6/28* (2013.01); *B60K 6/365* (2013.01); *B60K 6/445* (2013.01); *B60W 10/08* (2013.01); *B60W 10/26* (2013.01); *B60W 30/182* (2013.01); *B60W 50/082* (2013.01); *B60K 6/46* (2013.01); *B60L 2240/54* (2013.01); *B60L 2260/28* (2013.01); *B60W 2300/18* (2013.01); *B60W 2510/244* (2013.01); *B60W 2710/244* (2013.01); *B60Y 2200/92* (2013.01)

(58) Field of Classification Search
CPC ...... B60W 20/13; B60W 10/08; B60W 10/26; B60W 30/182; B60W 50/082; B60K 1/02; B60K 6/28; B60K 6/365; B60K 6/445
USPC ........................................ 180/65.21, 65.265
See application file for complete search history.

(56) References Cited

U.S. PATENT DOCUMENTS 8,452,471 B2 * 5/2013 Wilde ................... B60W 10/06
701/22
8,849,485 B2 * 9/2014 Christ ................. B60L 15/2045
701/22

(Continued)

FOREIGN PATENT DOCUMENTS

JP    2016159848 A    9/2016

*Primary Examiner* — John D Walters
(74) *Attorney, Agent, or Firm* — Dinsmore & Shohl LLP (57) ABSTRACT

A hybrid vehicle includes a controller. First control is control of an engine and a motor such that the hybrid vehicle travels by switching between a charge depleting mode and a charge sustaining mode. Second control is control of the engine and the motor such that the hybrid vehicle travels in accordance with a travel plan in which the charge depleting mode or the charge sustaining mode is assigned to each travel section of a travel plan route to a destination. The controller controls the engine and the motor such that a state of charge of an electric power storage device becomes higher in the charge sustaining mode in the second control than in the charge sustaining mode in the first control.

7 Claims, 7 Drawing Sheets

(51) Int. Cl.
*B60W 50/08* (2020.01)
*B60K 6/46* (2007.10)

(56) References Cited

U.S. PATENT DOCUMENTS 10,099,695 B2 * 10/2018 Sawada ................ B60W 10/08
2016/0257294 A1   9/2016 Morisaki

* cited by examiner

HYBRID VEHICLE

CROSS-REFERENCE TO RELATED APPLICATIONS

This application claims priority to Japanese Patent Application No. 2018-023023 filed on Feb. 13, 2018, which is incorporated herein by reference in its entirety including the specification, drawings and abstract.

BACKGROUND

1. Technical Field

The disclosure relates to a hybrid vehicle and, in particular, to a hybrid vehicle that includes an engine, a motor, and an electric power storage device.

2. Description of Related Art

Conventionally, as a hybrid vehicle of this type that includes an engine, a motor, and a battery that stores electric power from the motor and supplies electric power to the motor, a hybrid vehicle in which a charge depleting (CD) mode or a charge sustaining (CS) mode is assigned to each travel section of a travel plan route to a destination on the basis of a travel load so as to create a plan and in which the engine and the motor are controlled to realize travel in accordance with the plan has been proposed (for example, see Japanese Patent Application Publication No. 2016-159848 (JP 2016-159848 A)). In such a hybrid vehicle, in the case where a travel section in which the travel load cannot be calculated is present upon creation of the plan, the CD mode is assigned to such a travel section. In this way, even when the travel section in which the travel load cannot be calculated is present, the plan can be created.

SUMMARY

In the above-described hybrid vehicle, in the case where a larger amount of energy (a larger electric power amount) of the battery than expected is consumed in the travel section in the CS mode, an amount of the energy of the battery that can be used later in the travel section in the CD mode becomes smaller than expected.

The disclosure provides a hybrid vehicle that suppresses an amount of energy of an electric power storage device capable of being used in a travel section in a CD mode from becoming smaller than expected in the case where the vehicle travels in accordance with a travel plan in which the CD mode or a CS mode is assigned to each of the travel sections of a travel plan route to a destination.

A hybrid vehicle of the disclosure is summarized as a hybrid vehicle including: an engine; a motor; an electric power storage device configured to store electric power from the motor and supply electric power to the motor; and a controller configured to execute first control when a specified condition is not satisfied and to execute second control when the specified condition is satisfied, the specified condition including such a condition that a destination has been set, the first control being control of the engine and the motor such that the hybrid vehicle travels by switching between a charge depleting (CD) mode and a charge sustaining (CS) mode, and second control being control of the engine and the motor such that the hybrid vehicle travels in accordance with a travel plan in which the CD mode or the CS mode is assigned to each travel section of a travel plan route to the destination when the specified condition is satisfied, in which the controller is configured to control the engine and the motor such that a state of charge of the electric power storage device becomes higher in the CS mode in the second control than in the CS mode in the first control.

In this hybrid vehicle of the disclosure, when the specified condition including such a condition that the destination has been set is not satisfied, the first control is executed to control the engine and the motor such that the hybrid vehicle travels by switching between the CD mode and the CS mode. When the specified condition is satisfied, the second control is executed to control the engine and the motor such that the hybrid vehicle travels in accordance with the travel plan in which the CD mode or the CS mode is assigned to each of the travel sections of the travel plan route to the destination. In addition, in the CS mode in the second control, the engine and the motor are controlled such that the state of charge of the electric power storage device becomes higher than that in the CS mode in the first control. In this way, compared to the case where the same control as that in the CS mode in the first control is executed in the CS mode in the second control, the state of charge of the electric power storage device can be made high in the travel section in the CS mode in the second control. As a result, it is possible to suppress an amount of energy of the electric power storage device, which can be consumed in the following travel section in CS mode in the second control, from becoming smaller than expected. Here, the CD mode is a mode in which the state of charge of the electric power storage device is reduced. The CS mode is a mode in which the state of charge of the electric power storage device is maintained within a management range including a control center.

In such a hybrid vehicle of the disclosure, the controller may be configured to set a start threshold of the engine to be lower in the CS mode in the second control than in the CS mode in the first control. In this way, in the CS mode in the second control, a start of the engine is facilitated in comparison with the CS mode in the first control. Thus, the state of charge of the electric power storage device can be made high.

In addition, in the hybrid vehicle of the disclosure, the controller may be configured to set a stop threshold of the engine to be lower in the CS mode in the second control than in the CS mode in the first control. In this way, in the CS mode in the second control, a stop of the engine is impeded in comparison with the CS mode in the first control. Thus, the state of charge of the electric power storage device can be made high.

Furthermore, in the hybrid vehicle of the disclosure, in the CS mode in the second control, the controller may execute at least one of increasing a target charged/discharged amount of the electric power storage device to a charged side, increasing allowable charge electric power of the electric power storage device, and reducing allowable discharge electric power of the electric power storage device in comparison with those in the CS mode in the first control. In this way, in the CS mode in the second control, the state of charge of the electric power storage device can be made higher than that in the CS mode in the first control by increasing the target charged-discharged amount of the electric power storage device to the charged side.

In the hybrid vehicle of the disclosure, the controller may be configured to execute the same control as that in the CS mode in the first control in the case where a distance to the destination is shorter than a specified distance in the CS mode in the second control. In the case where the state of charge of the electric power storage device is made high in the travel section in the CS mode when the distance to the destination is short, there is a possibility that the high state of charge of the electric power storage device cannot sufficiently be consumed in the travel section in the CD mode to the destination. In consideration of the above, the same control as that in the CS mode in the first control may be executed in the case where the distance to the destination is shorter than the specified distance in the CS mode in the second control.

In addition, in the hybrid vehicle of the disclosure, the controller may be configured to execute the same control as that in the CS mode in the first control in the case where a current location is not on a controlled-access highway in the CS mode in the second control. When the current location is not on the controlled-access highway, it is considered that, compared to the controlled-access highway, a travel load is low and there is a low possibility that a larger amount of the energy of the electric power storage device than expected is consumed in the travel sections in the CS mode and the CD mode. Accordingly, in the case where the state of charge of the electric power storage device is made high in the travel section in the CS mode, there is the possibility that the high state of charge of the electric power storage device cannot sufficiently be consumed in the travel section in the CD mode to the destination. In consideration of the above, the same control as that in the CS mode in the first control may be executed in the case where the current location is not on the controlled-access highway in the CS mode in the second control.

Furthermore, in the hybrid vehicle of the disclosure, the controller may be configured to execute the same control as that in the CS mode in the first control in the case where the current location is in a congested section in the CS mode in the second control. When the current location is in the congested section, it is considered that the travel load is low and there is the low possibility that the larger amount of the energy of the electric power storage device than expected is consumed in the travel sections in the CS mode and the CD mode. Accordingly, in the case where the state of charge of the electric power storage device is made high in the travel section in the CS mode, there is the possibility that the high state of charge of the electric power storage device cannot sufficiently be consumed in the travel section in the CD mode to the destination. In consideration of the above, the same control as that in the CS mode in the first control may be executed in the case where the current location is in the congested section in the CS mode in the second control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a mode for carrying out the disclosure will be described by using an embodiment.

Figure 1:
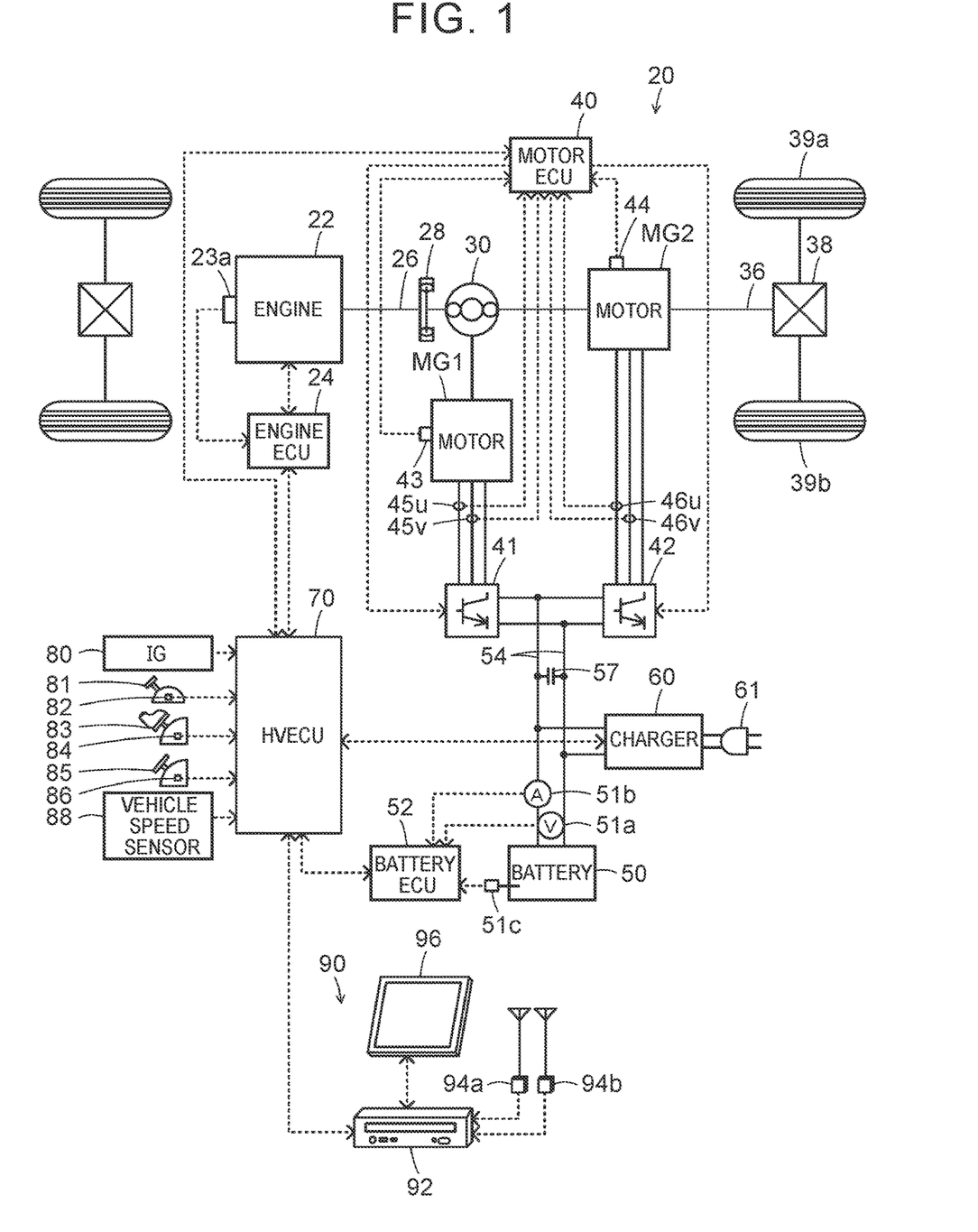
FIG. 1 is a configuration diagram that schematically shows a configuration of a hybrid vehicle 20 as an embodiment of the disclosure.

FIG. 1 is a configuration diagram that schematically shows a configuration of a hybrid vehicle 20 as an embodiment of the disclosure. As shown in FIG. 1, the hybrid vehicle 20 of the embodiment includes an engine 22, a planetary gear 30, motors MG1 MG2, inverters 41, 42, a battery 50 as an electric power storage device, a charger 60, a navigation system 90, and a hybrid electronic control unit (hereinafter referred to as a "HVECU") 70.

The engine 22 is configured as an internal combustion engine that uses fuel such as gasoline or diesel fuel to output power, and is connected to a carrier of the planetary gear 30 via a damper 28. An operation of this engine 22 is controlled by an engine electronic control unit (hereinafter referred to as an "engine ECU") 24.

Although not shown, the engine ECU 24 is configured as a microprocessor having a CPU as a central component and includes, in addition to the CPU, ROM that stores processing programs, RAM that temporarily stores data, input/output ports, and a communication port. The engine ECU 24 receives signals that are required to control the operation of the engine 22 from various sensors via the input port, and one example of the signal is a crank angle θcr from a crank position sensor 23a that detects a rotational position of a crankshaft 26 of the engine 22. The engine ECU 24 outputs various control signals used to control the operation of the engine 22 via the output port. The engine ECU 24 is connected to the HVECU 70 via the communication port. The engine ECU 24 calculates a speed Ne of the engine 22 on the basis of the crank angle θcr from the crank position sensor 23a.

The planetary gear 30 is configured as a planetary gear mechanism of a single pinion type. A rotor of the motor MG1 is connected to a sun gear of the planetary gear 30. A driveshaft 36 that is coupled to drive wheels 39a, 39b via a differential gear 38 is connected to a ring gear of the planetary gear 30. As described above, the crankshaft 26 of the engine 22 is connected to the carrier of the planetary gear 30 via the damper 28.

The motor MG1 is configured as a synchronous generator-motor, for example, and, as described above, the rotor thereof is connected to the sun gear of the planetary gear 30. The motor MG2 is configured as a synchronous generator-motor, for example, and a rotor thereof is connected to the driveshaft 36. The inverters 41, 42 are used to drive the motors MG1, MG2, respectively, and are each connected to the battery 50 via an electric power line 54. A smoothing capacitor 57 is attached to each of the electric power lines 54. The motors MG1, MG2 are rotationally driven when plural switching elements, which are not shown, of the inverters 41, 42 are subjected to switching control by a motor electronic control unit (hereinafter referred to as a "motor ECU") 40.

Although not shown, the motor ECU 40 is configured as a microprocessor having a CPU as a central component and includes, in addition to the CPU, ROM that stores processing programs, RAM that temporarily stores data, input/output ports, and a communication port. The motor ECU 40 receives signals that are required to control driving of the motors MG1, MG2 from various sensors via the input port, and examples of the signals are rotational positions θm1, θm2 from rotational position detection sensors 43, 44 that respectively detect rotational positions of the rotors of the motors MG1, MG2 and phase currents Iu1, Iv1, Iu2, Iv2 from current sensors 45u, 45v, 46u, 46v, each of which detects a current flowing through a phase of one of the motors MG1, MG2. The motor ECU 40 outputs switching control signals to the plural switching elements of the inverters 41, 42, and the like via the output port. The motor ECU 40 is connected to the HVECU 70 via the communication port. The motor ECU 40 calculates electrical angles θe1, θe2, angular velocities ωm1, ωm2, and rotational speeds Nm1, Nm2 of the motors MG1 MG2 on the basis of the rotational positions θm1, θm2 of the rotors of the motors MG1, MG2 from the rotational position detection sensors 43, 44.

The battery 50 is configured as a lithium-ion secondary battery or a nickel-metal hydride secondary battery, for example, and is connected to the electric power lines 54. This battery 50 is managed by a battery electronic control unit (hereinafter referred to as a "battery ECU") 52.

Although not shown, the battery ECU 52 is configured as a microprocessor having a CPU as a central component and includes, in addition to the CPU, ROM that stores processing programs, RAM that temporarily stores data, input/output ports, and a communication port. The battery ECU 52 receives signals that are required to manage the battery 50 from various sensors via the input port. Examples of the signals received by the battery ECU 52 are a voltage Vb of the battery 50 from a voltage sensor 51a that is attached between terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 70 via the communication port. The battery ECU 52 calculates a state of charge SOC, an amount of consumable energy Eb, input/output limits Win, Wout of the battery 50. The state of charge SOC of the battery 50 is a ratio of an electric power amount that can be discharged from the battery 50 to total capacity of the battery 50, and is calculated on the basis of an integrated value of the current Ib of the battery 50 from the current sensor 51b. The amount of the consumable energy Eb of the battery 50 is acquired by converting a difference (SOC−Smin) between the state of charge SOC of the battery 50 and a threshold Smin to energy, and is calculated as a product of the difference (SOC−Smin) and the total capacity. As the threshold Smin, for example, 20%, 25%, 30%, or the like is used. The input/output limits Win, Wout of the battery 50 are allowable charge/discharge electric power that can be stored/discharged in/from the battery 50, and are calculated on the basis of the state of charge SOC of the battery 50 and the temperature Tb of the battery 50 from the temperature sensor 51c.

The charger 60 is connected to the electric power lines 54 and is configured to be able to charge the battery 50 by the electric power from an external power supply when an electric power plug 61 is connected to the external power supply such as a household power supply or an industrial power supply at a charge point such as a house or a charging station.

The navigation system 90 includes: a main body 92 in which a control unit having a storage medium such as a hard disk that stores map information and the like, input/output ports, and a communication port is installed; a GPS antenna 94a that receives information on a current location of a host vehicle; a VICS® antenna 94b that receives traffic jam information, regulation information, disaster information, and the like from an information center; and a touch-screen display 96 that displays various types of the information such as the information on the current location of the host vehicle and a travel plan route to a destination and to which a user can input various commands. Here, in the map information, service information (for example, sightseeing information, parking lots, and the like), road information of each travel section (for example, between traffic lights, between intersections, and the like), and the like are stored as a database. The road information includes distance information, road width information, lane number information, area information (urban or rural), type information (a public road or a controlled-access highway), gradient information, a legal speed, the number of the traffic lights, and the like. The navigation system 90 is connected to the HVECU 70 via the communication port.

When the user operates the display 96 to set the destination, the main body 92 of this navigation system 90 sets the travel plan route from the current location of the host vehicle to the destination on the basis of the map information stored in the main body 92, the current location of the host vehicle from the GPS antenna 94a, and the destination, shows the set travel plan route on the display 96, and provides route guidance. In addition, the navigation system 90 estimates a travel load in each of the travel sections of the travel plan route when setting the travel plan route to the destination. The travel load in each of the travel sections is estimated on the basis of the road information (for example, the distance information, the type information, the gradient information, the legal speed, and the like).

Although not shown, the HVECU 70 is configured as a microprocessor having a CPU as a central component and includes, in addition to the CPU, ROM that stores processing programs, RAM that temporarily stores data, input/output ports, and a communication port. The HVECU 70 receives signals from various sensors via the input port. Examples of the signals received by the HVECU 70 are an ignition signal from an ignition switch 80 and a shift position SP from a shift position sensor 82 that detects an operation position of a shift lever 81. Further examples of the signals are an accelerator operation amount Acc from an accelerator position sensor 84 that detects a depression amount of an accelerator pedal 83, a brake pedal position BP from a brake pedal position sensor 86 that detects a depression amount of a brake pedal 85, and a vehicle speed V from a vehicle speed sensor 88. The HVECU 70 outputs control signals to the charger 60 via the output port. As described above, the HVECU 70 is connected to the engine ECU 24, the motor ECU 40, the battery ECU 52, and the navigation system 90 via the communication port.

In the hybrid vehicle 20 of the embodiment that is configured as described above, the charger 60 is controlled such that, in the case where the electric power plug 61 is connected to the external power supply when a system is shut off (the system is stopped) and the vehicle is stopped at the charge point such as the house or the charging station, the battery 50 can be charged by using the electric power from the external power supply.

In addition, the hybrid vehicle 20 of the embodiment makes hybrid travel (HV travel) or electric travel (EV travel)

in a charge depleting (CD) mode or a charge sustaining (CS) mode. Here, in the HV travel, the hybrid vehicle 20 travels together with the operation of the engine 22. In the EV travel, the hybrid vehicle 20 travels without the operation of the engine 22. The CD mode is a mode in which the state of charge SOC of the battery 50 is reduced. The CS mode is a mode in which the state of charge SOC of the battery 50 is maintained within a management range including a control center SOC*. In the CD mode, the EV travel is more likely to be made than the HV travel when compared to the CS mode.

In the HV travel, the HVECU 70 sets requested torque Td* that is requested for the driveshaft 36 on the basis of the accelerator operation amount Acc and the vehicle speed V, and calculates requested power Pd* that is requested for the driveshaft 36 by multiplying the set requested torque Td* by a rotational speed Nd of the driveshaft 36 (a rotational speed Nm2 of the motor MG2). Next, the HVECU 70 sets requested charge/discharge electric power Pb* of the battery 50 (having a positive value when the electric power is discharged from the battery 50) such that a value (SOC−SOC*) acquired by subtracting a target state of charge SOC* from the state of charge SOC of the battery 50 approximates a value of 0, and sets requested power Pe* that is requested for the engine 22 by subtracting the requested charge/discharge electric power Pb* of the battery 50 from the requested power Pd*. Then, the HVECU 70 sets a target speed Ne* and target torque Te* of the engine 22 and torque commands Tm1*, Tm2* of the motors MG1, MG2 such that the requested power Pe* is output from the engine 22 and the requested torque Td* is output from the driveshaft 36 within a range of the input/output limits Win, Wout of the battery 50. Thereafter, the HVECU 70 sends the target speed Ne* and the target torque Te* of the engine 22 to the engine ECU 24 and sends the torque commands Tm1*, Tm2* of the motors MG1, MG2 to the motor ECU 40. When receiving the target speed Ne* and the target torque Te* of the engine 22, the engine ECU 24 executes operation control (intake air amount control, fuel injection control, ignition control, and the like) of the engine 22 such that the engine 22 is operated on the basis of the target speed Ne* and the target torque Te*. When receiving the torque commands Tm1*, Tm2* of the motors MG1, MG2, the motor ECU 40 execute drive control of the motors MG1, MG2 (more specifically, the switching control of the plural switching elements of the inverters 41, 42) such that the motors MG1, MG2 are driven in accordance with the torque commands Tm1*, Tm2*.

In this HV travel, in the case where the requested torque Td* becomes equal to or lower than a stop threshold Tsp and the requested power Pe* becomes equal to or lower than a stop threshold Psp in a state where the state of charge SOC of the battery 50 is higher than a threshold Sch, it is determined that a stop condition of the engine 22 is satisfied. Consequently, the operation of the engine 22 is stopped, and the hybrid vehicle 20 is shifted to the EV travel. Here, the threshold Sch is defined as a value that is lower than the above-described threshold Smin, and a value such as 5%, 7%, or 10% that is lower than the threshold Smin is used, for example. Here, as the stop threshold Tsp, a CD mode stop threshold Tspcd is used in the CD mode, and a CS mode stop threshold Tspcs that is lower than the CD mode stop threshold Tspcd is used in the CS mode. As the stop threshold Psp, a CD mode stop threshold Pspcd is used in the CD mode, and a CS mode stop threshold Pspcs that is lower than the CD mode stop threshold Pspcd is used in the CS mode. In the embodiment, the CS mode stop thresholds Tspcs, Pspcs are set by a processing routine, which will be described below, and constant values are used for the CD mode stop thresholds Tspcd, Pspcd.

In the EV travel, the HVECU 70 sets the requested torque Td* on the basis of the accelerator operation amount Acc and the vehicle speed V, sets the torque command Tm1* of the motor MG1 to a value 0, sets the torque command Tm2* of the motor MG2 such that the requested torque Td* is output to the driveshaft 36 within the range of the input/output limits Win, Wout of the battery 50, and sends the torque commands Tm1*, Tm2* of the motors MG1, MG2 to the motor ECU 40. The drive control of the motors MG1, MG2 by the motor ECU 40 has been described above.

In this EV travel, in the case where the state of charge SOC of the battery 50 becomes equal to or lower than the above-described threshold Sch, the requested torque Td* becomes higher than a start threshold Tst, and the requested power Pe* that is calculated in the same manner as that in the HV travel becomes equal to or higher than a start threshold Pst, it is determined that a start condition of the engine 22 is satisfied. Consequently, the engine 22 is started, and the hybrid vehicle 20 is shifted to the HV travel. Here, as the start threshold Tst, a CD mode start threshold Tstcd that is higher than the CD mode stop threshold Tspcd is used in the CD mode, and a CS mode start threshold Tstcs that is higher than the CS mode stop threshold Tspcs and is lower than the CD mode start threshold Tstcd is used in the CS mode. As the start threshold Pst, a CD mode start threshold Pstcd that is higher than the CD mode stop threshold Pspcd is used in the CD mode, and a CS mode start threshold Pstcs that is higher than the CS mode stop threshold Pspcs and lower than the CD mode start threshold Pstcd is used in the CS mode. In the embodiment, the CS mode start thresholds Tstcs, Pstcs are set by the processing routine, which will be described below, and constant values are used for the CD mode start thresholds Tstcd, Pstcd.

Figure 2:
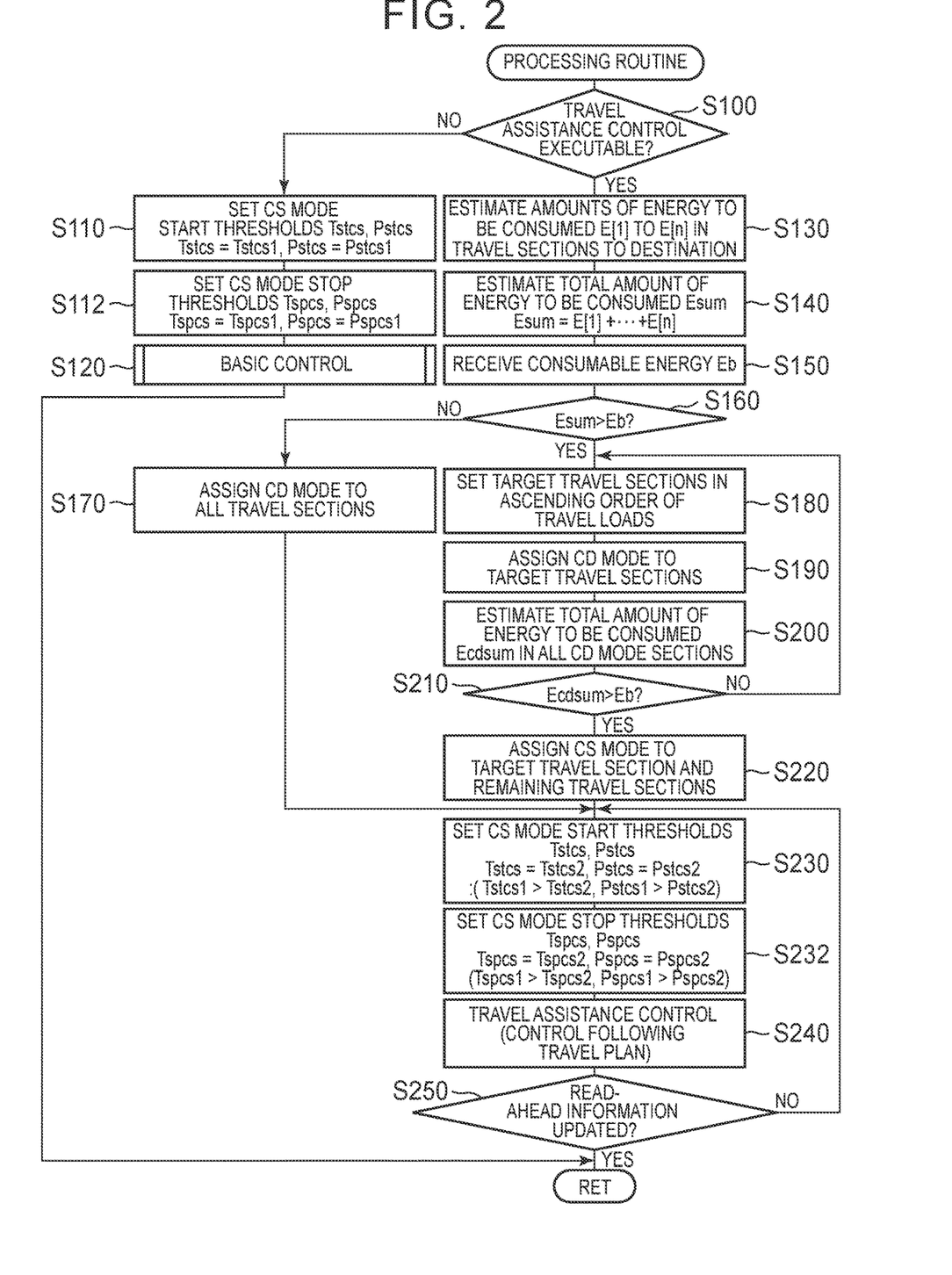
FIG. 2 is a flowchart of an example of a processing routine that is executed by a HVECU 70.

Next, a description will be made on an operation of the hybrid vehicle 20 in the embodiment that is configured as described so far. FIG. 2 is a flowchart of an example of the processing routine that is executed by the HVECU 70. This routine is repeatedly executed.

When the processing routine in FIG. 2 is executed, the HVECU 70 initially determines whether travel assistance control can be executed (step S100). Here, the travel assistance control is control in which the hybrid vehicle 20 makes the HV travel or the EV travel in the CD mode or the CS mode in accordance with a travel plan in which the CD mode or the CS mode is assigned to each of the travel sections of the travel plan route to the destination. In the embodiment, in the case where the navigation system 90 provides the route guidance of the travel plan route and the state of charge SOC of the battery 50 is higher than the above-described threshold Smin, it is determined that the travel assistance control can be executed. On the other hand, in the case where the navigation system 90 does not provide the route guidance of the travel plan route and the state of charge SOC of the battery 50 is equal to or lower than the threshold Smin, it is determined that the travel assistance control cannot be executed. Note that the route guidance of the travel plan route by the navigation system 90 is initiated when the travel plan route to the destination is set, and is thereafter terminated when the host vehicle arrives at the destination, the user deletes the destination, the ignition switch 80 is turned off, or the like.

If it is determined in step S100 that the travel assistance control cannot be executed, the CS mode start thresholds Tstcs, Pstcs are set to basic values Tstcs1, Pstcs1 (step S110), the CS mode stop thresholds Tspcs, Pspcs are set to basic values Tspcs1, Pspcs1 (step S112), basic control is executed (step S120), and this routine is terminated.

Here, the basic control is control in which the hybrid vehicle 20 makes the HV travel or the EV travel in the CD mode or the CS mode on the basis of the state of charge SOC of the battery 50. In the case where the travel assistance control cannot be executed due to absence of the route guidance of the travel plan route, as execution of the basic control, the hybrid vehicle 20 travels in the CD mode after the system is activated and before the state of charge SOC of the battery 50 becomes equal to or lower than the threshold Smin. Thereafter, at the time when the state of charge SOC of the battery 50 becomes equal to or lower than the threshold Smin onward, the hybrid vehicle 20 travels in the CS mode. Meanwhile, in the case where the route guidance of the travel plan route is provided but the travel assistance control cannot be executed due to a reason that the state of charge SOC of the battery 50 is equal to or lower than the threshold Smin, as the execution of the basic control, the hybrid vehicle 20 travels in the CS mode.

If it is determined in step S100 that the travel assistance control can be executed, the CD mode or the CS mode is assigned to each of the travel sections of the travel plan route to the destination so as to create (update) the travel plan (step S130 to S220). Hereinafter, the creation of the travel plan to the destination will be described. Hereinafter, the travel section to which the CD mode is assigned will be referred to as a "CD mode section", and the travel section to which the CS mode is assigned will be referred to as a "CS mode section".

When the travel plan to the destination is created, amounts of the amounts of the energy to be consumed E[1] to E[n] in the travel sections of the travel plan route to the destination are initially estimated (step S130), and a total amount of the energy to be consumed Esum up to the destination is estimated as a sum of the amounts of the estimated energy to be consumed E[1] to E[n] in the travel sections (step S140). Here, the value 1 to the value n are numbers that represents the travel sections of the travel plan route to the destination from the current location of the host vehicle. In the processing in step S130, the HVECU 70 receives travel loads R[1] to R[n] in the travel sections of the travel plan route to the destination via the communication with the navigation system 90, and estimates the amounts of the energy to be consumed E[1] to E[n] in the travel section on the basis of the received travel loads R[1] to R[n] in the travel sections. More specifically, the HVECU 70 estimates the larger amounts of the energy to be consumed E[1] to E[n] of the travel sections as the travel loads R[1] to R[n] in the travel sections are increased.

Next, the HVECU 70 receives the amount of the consumable energy Eb of the battery 50 via the communication with the battery ECU 52 (step S150), and compares the total amount of the energy to be consumed Esum up to the destination with the amount of the consumable energy Eb of the battery 50 (step S160). The processing in step S160 is processing to determine whether the hybrid vehicle 20 can travel to the destination only by the EV travel.

If the total amount of the energy to be consumed Esum up to the destination is equal to or smaller than the amount of the consumable energy Eb of the battery 50 in step S160, it is determined that the hybrid vehicle 20 can travel to the destination only by the EV travel, the CD mode is assigned to all the travel sections of the travel plan route to the destination, and the travel plan is thereby created (updated) (step S170).

If the total amount of the energy to be consumed Esum up to the destination is larger than the amount of the consumable energy Eb of the battery 50 in step S160, it is determined that the hybrid vehicle 20 cannot travel to the destination only by the EV travel, and target travel sections are set from the travel sections of the travel plan route to the destination (step S180). In this processing, of the travel sections, the travel section to which the CD mode is not assigned and in which the travel load is the lowest is set as the target travel section.

Next, the CD mode is assigned to the set target travel sections (step S190), and a total amount of energy to be consumed Ecdsum in all the CD mode sections is estimated (step S200). In the processing in step S200, of the amounts of the energy to be consumed E[1] to E[n] of the travel sections of the travel plan route to the destination, a sum of the amounts of the energy to be consumed in all the CD mode sections is calculated as the total amount of the energy to be consumed Ecdsum.

Once the total amount of the energy to be consumed Ecdsum is estimated just as described, the estimated total amount of the energy to be consumed Ecdsum is compared with the amount of the consumable energy Eb of the battery 50 (step S210). This processing is processing to determine whether the hybrid vehicle 20 can travel all the CD mode sections only be the EV travel. If the total amount of the energy to be consumed Ecdsum is equal to or smaller than the amount of the consumable energy Eb of the battery 50 in step S210, it is determined that the hybrid vehicle 20 can travel all the CD mode sections only by the EV travel, and the processing returns to step S180. Just as described, the CD mode is assigned to the travel sections of the travel plan route to the destination in an ascending order of the travel loads.

If the total amount of the energy to be consumed Ecdsum is larger than the amount of the consumable energy Eb of the battery 50 in step S210, it is determined that the hybrid vehicle 20 cannot travel in all the CD mode sections only by the EV travel, and the CS mode is assigned to the current target travel section and the remaining travel sections (step S220). Because it is considered in step S160 that the total amount of the energy to be consumed Esum up to the destination is larger than the amount of the consumable energy Eb of the battery 50, the CS mode is assigned to at least one of the travel sections.

In the case where the travel plan to the destination is created (updated) by the processing in steps S130 to S220 as described above, the CS mode start thresholds Tstcs, Pstcs are set to lower values Tstcs2, Pstcs2 than the basic values Tstcs1, Pstcs1 (the values in the basic control) (step S230), the CS mode stop thresholds Tspcs, Pspcs are set to lower values Tspcs2, Pspsc2 than the basic values Tspcs1, Pspcs1 (the values in the basic control) (step S232), and the travel assistance control (the control in which the engine 22 and the motors MG1, MG2 are controlled for the travel following the travel plan) (step S240).

The CS mode start thresholds Tstcs, Pstcs are set to be smaller in the travel assistance control than in the basic control. In this way, the start condition of the engine 22 is more likely to be satisfied in the CS mode in the travel assistance control than in the CS mode in the basic control. Thus, shifting of the hybrid vehicle 20 from the EV travel to the HV travel is promoted. In addition, the CS mode stop thresholds Tspcs, Pspcs are set to be lower in the travel assistance control than in the basic control. In this way, the stop condition of the engine 22 is less likely to be satisfied in the CS mode in the travel assistance control than in the CS mode in the basic control. Thus, shifting of the hybrid vehicle 20 from the EV travel to the HV travel is impeded (continuation of the HV travel is promoted). Furthermore, in the HV travel, the value (SOC−SOC*) that is acquired by subtracting the target state of charge SOC* from the state of charge SOC of the battery 50 is controlled to approximate the value 0. Thus, the state of charge SOC of the battery 50 is likely to become higher in the HV travel than in the EV travel. From what have been described so far, it can be said that, in the case where the CS mode start thresholds Tstcs, Pstcs and the CS mode stop thresholds Tspcs, Pspcs are set to be lower in the travel assistance control than in the basic control, the state of charge SOC of the battery 50 can be made high in the CS mode sections in the travel assistance control when compared to the case where the CS mode start thresholds Tstcs, Pstcs and the CS mode stop thresholds Tspcs, Pspcs in the travel assistance control are set to be equal to those in the basic control. In this way, it is possible to suppress the amount of the consumable energy Eb of the battery 50, which can be consumed in the following CD mode section in the travel assistance control, from becoming smaller than expected. As a result, it is possible to suppress the state of charge SOC of the battery 50 from becoming equal to or lower than the threshold Smin in the CD mode section in the travel assistance control and thereby suppress the execution of the travel assistance control from being inhibited.

Next, it is determined whether read-ahead information has been updated via the communication with the navigation system 90 (step S250). Here, examples of the read-ahead information are the road information and the traffic jam information from the current location of the host vehicle to a destination-side point by a specified distance (for example, approximately several kilometers to ten several kilometers) therefrom in the travel plan route. Such read-ahead information is updated when the travel plan route is changed after the last update of the read-ahead information, when a specified time (for example, approximately several tens of seconds to several minutes) has elapsed since the last update of the read-ahead information, when the hybrid vehicle 20 has traveled for a specified distance (for example, approximately several hundreds of meters to several kilometers) since the last update of the read-ahead information, or the like. If it is determined that the read-ahead information has not been updated, the processing returns to step S230. If it is determined that the read-ahead information has been updated, this routine is terminated.

In the hybrid vehicle 20 of the embodiment that has been described so far, the CS mode start thresholds Tstcs, Pstcs and the CS mode stop thresholds Tspcs, Pspcs are set to be lower in the travel assistance control than in the basic control. In this way, the state of charge SOC of the battery 50 can be made high in the CS mode sections in the travel assistance control when compared to the case where the CS mode start thresholds Tstcs, Pstcs and the CS mode stop thresholds Tspcs, Pspcs in the travel assistance control are set to be equal to those in the basic control. As a result, it is possible to suppress the amount of the consumable energy Eb of the battery 50, which can be consumed in the following CD mode sections in the travel assistance control, from becoming smaller than expected.

In the hybrid vehicle 20 of the embodiment, as described by using the processing routine in FIG. 2, the CS mode start thresholds Tstcs, Pstcs and the CS mode stop thresholds Tspcs, Pspcs are changed on the basis of whether the current control is the basic control or the travel assistance control. However, on the basis of whether the current control is the basic control or the travel assistance control, only one or some of the CS mode start threshold Tstcs, the CS mode start threshold Pstcs, the CS mode stop threshold Tspcs, and the CS mode stop threshold Pspcs (for example, the CS mode start thresholds Tstcs, Pstcs) may be changed.

As described above, in the processing routine in FIG. 2 and the modified example thereof, at least one of the CS mode start threshold Tstcs, the CS mode start threshold Pstcs, the CS mode stop threshold Tspcs, and the CS mode stop threshold Pspcs is changed on the basis of whether the current control is the basic control or the travel assistance control. However, instead of the above, or in addition to the above, at least one of the target state of charge SOC*, the input limit Win, and the output limit Wout of the battery 50 may be changed on the basis of whether the current control is the basic control or the travel assistance control.

Figure 3:
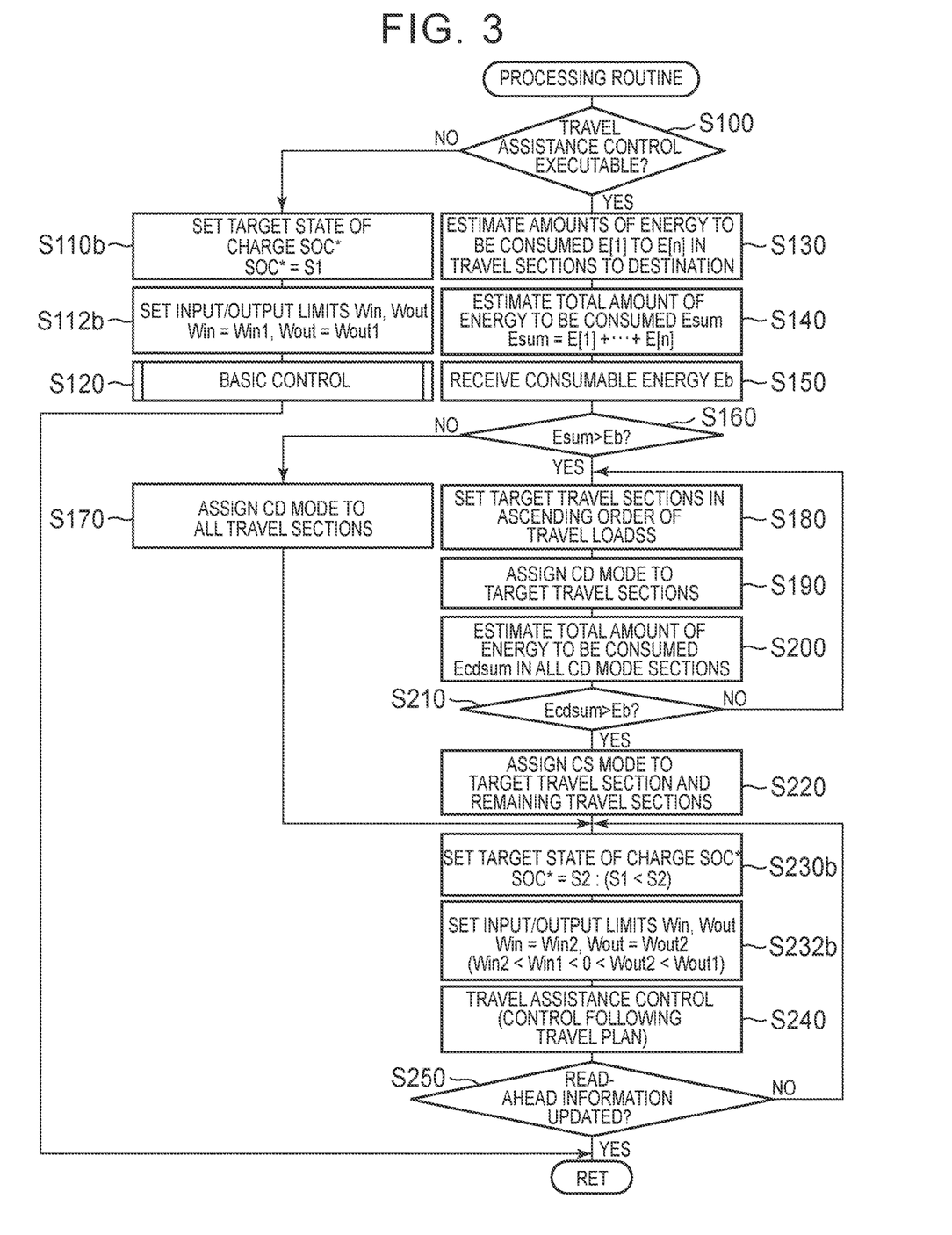
FIG. 3 is a flowchart of an example of a processing routine in a modified example.

FIG. 3 is a flowchart of an example of a processing routine that is executed when the target state of charge SOC* and the input/output limits Win, Wout of the battery 50 are changed on the basis of whether the current control is the basic control or the travel assistance control. The processing routine in FIG. 3 is the same as the processing routine in FIG. 2 except for a point that processing in steps S110b, S112b, S230b, and S232b is executed instead of the processing in steps S110, S112, S230, and S232. Thus, the same processing in the processing routine in FIG. 3 as that in the processing routine in FIG. 2 will be denoted by the same step numbers, and the detailed description thereon will not be made.

In the processing routine in FIG. 3, if it is determined in step S100 that the travel assistance control cannot be executed, the target state of charge SOC* of the battery 50 is set to a basic value S1 (step S110b), the input limit Win of the battery 50 is set to a negative basic value Win1, and the output limit Wout of the battery 50 is set to a positive basic value Wout1 (step S112b). Then, the basic control is executed (step S120), and this routine is terminated.

Once the travel plan to the destination is created (updated) by the processing in steps S130 to S220, the target state of charge SOC* of the battery 50 is set to a higher value S2 than the basic value S1 (step S230b), the input limit Win of the battery 50 is set to a negative value Wing that is lower (higher as an absolute value) than the negative basic value Win1, and the output limit Wout of the battery 50 is set to a positive value Wout2 that is lower than the positive basic value Wout1 (step S232b). Then, the travel assistance control is executed (step S240), and the processing proceeds to above-described step S250.

With such control, in the CS mode sections in the travel assistance control, charged/discharged electric power of the battery 50 can be increased to the charged side (reduced to the discharged side), and the state of charge SOC of the battery 50 can be made high when compared to the case where the target state of charge SOC* and the input/output limits Win, Wout of the battery 50 in the travel assistance control are set to be equal to those in the basic control. As a result, it is possible to suppress the amount of the consumable energy Eb of the battery 50, which can be consumed in the following CD mode sections in the travel assistance control, from becoming smaller than expected.

Figure 4:
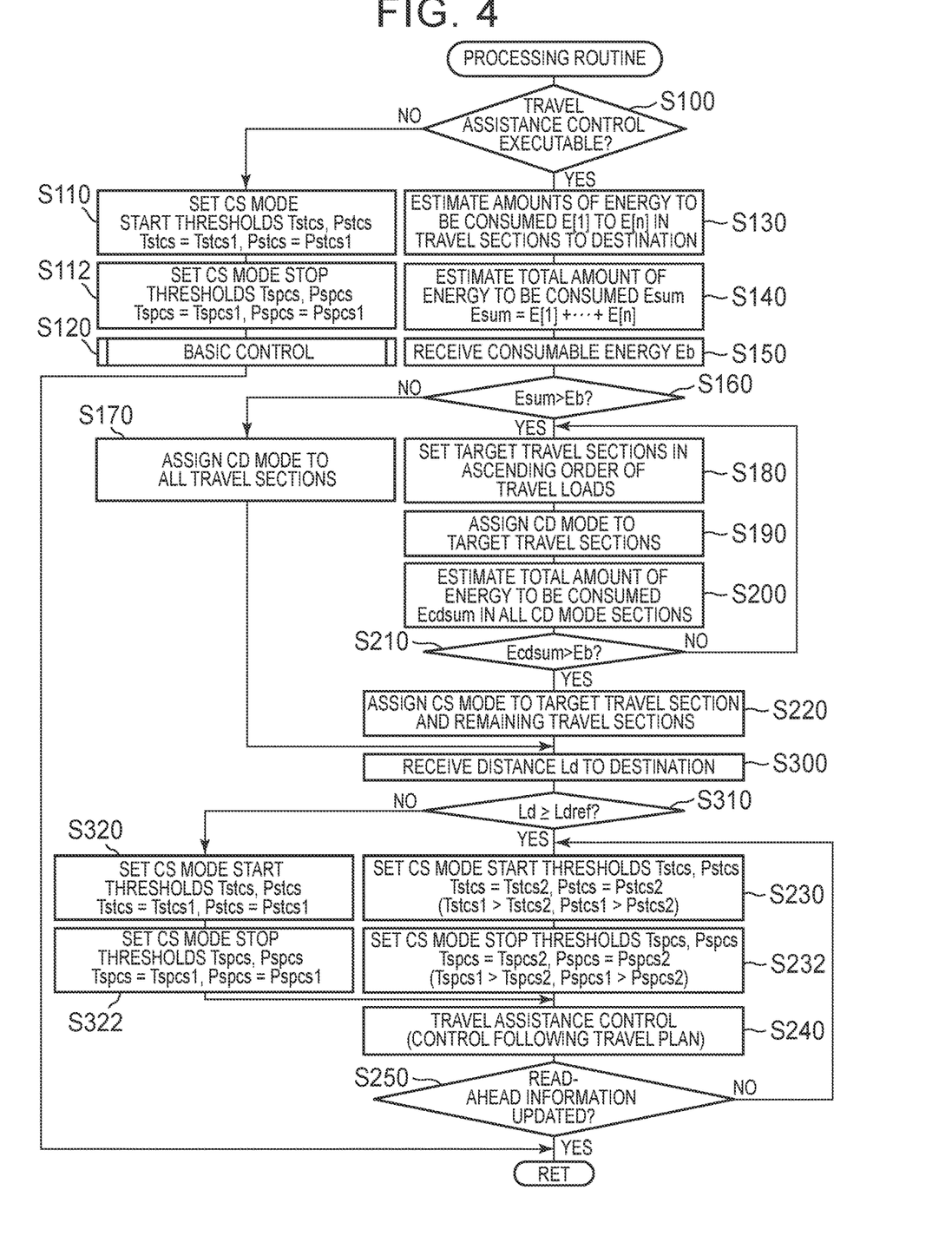
FIG. 4 is a flowchart of an example of a processing routine in another modified example.

In the hybrid vehicle 20 of the embodiment, the HVECU 70 executes the processing routine in FIG. 2. However, instead of the processing routine in FIG. 2, the HVECU 70 may execute a processing routine in FIG. 4. The processing routine in FIG. 4 is the same as the processing routine in FIG. 2 except for a point that processing in steps S300 to S322 are added. Thus, the same processing in the processing routine in FIG. 4 as that in the processing routine in FIG. 2 will be denoted by the same step numbers, and the detailed description thereon will not be made.

In the processing routine in FIG. 4, once creating (updating) the travel plan to the destination by the processing in steps S130 to S220, the HVECU 70 receives a distance Ld to the destination (step S300) and compares the received distance Ld to the destination with a threshold Ldref (step S310). Here, as the threshold Ldref, 1 km, 2 km, 3 km, or the like is used, for example.

If the distance Ld to the destination is equal to or longer than the threshold Ldref in step S310, the CS mode start thresholds Tstcs, Pstcs are set to the values Tstcs2, Pstcs2 (step S230), and the CS mode stop thresholds Tspcs, Pspcs are set to the values Tspcs2, Pspsc2 (step S232). Then, the travel assistance control is executed (step S240), and the processing proceeds to above-described step S250.

If the distance Ld to the destination is shorter than the threshold Ldref in step S310, the CS mode start thresholds Tstcs, Pstcs are set to the basic values Tstcs1, Pspcs1 (step S320), and the CS mode stop thresholds Tspcs, Pspcs are set to the basic values Tspcs1, Pspcs1 (step S322). Then, the travel assistance control is executed (step S240), and the processing proceeds to above-described step S250.

In the case where the CS mode start thresholds Tstcs, Pstcs and the CS mode stop thresholds Tspcs, Pspcs are reduced to promote the HV travel in the CS mode sections and to further increase the amount of the consumable energy Eb of the battery 50 when the distance Ld to the destination is short, there is a possibility that the increased amount of the consumable energy Eb cannot sufficiently be consumed in the CD mode sections to the destination (the certain large amount of the consumable energy Eb remains on arrival at the destination). In view of such a circumstance, as in this modified example, in the case where the distance Ld to the destination is shorter than the threshold Ldref when the travel assistance control is executed, it is considered to set the CS mode start thresholds Tstcs, Pstcs and the CS mode stop thresholds Tspcs, Pspcs to be equal to those in the basic control.

In this modified example, the HVECU 70 executes the processing routine in FIG. 4. However, instead of the processing routine in FIG. 4, the HVECU 70 may execute a processing routine in FIG. 5 or FIG. 6. Hereinafter, the processing routines in FIG. 5 and FIG. 6 will sequentially be described.

Figure 5:
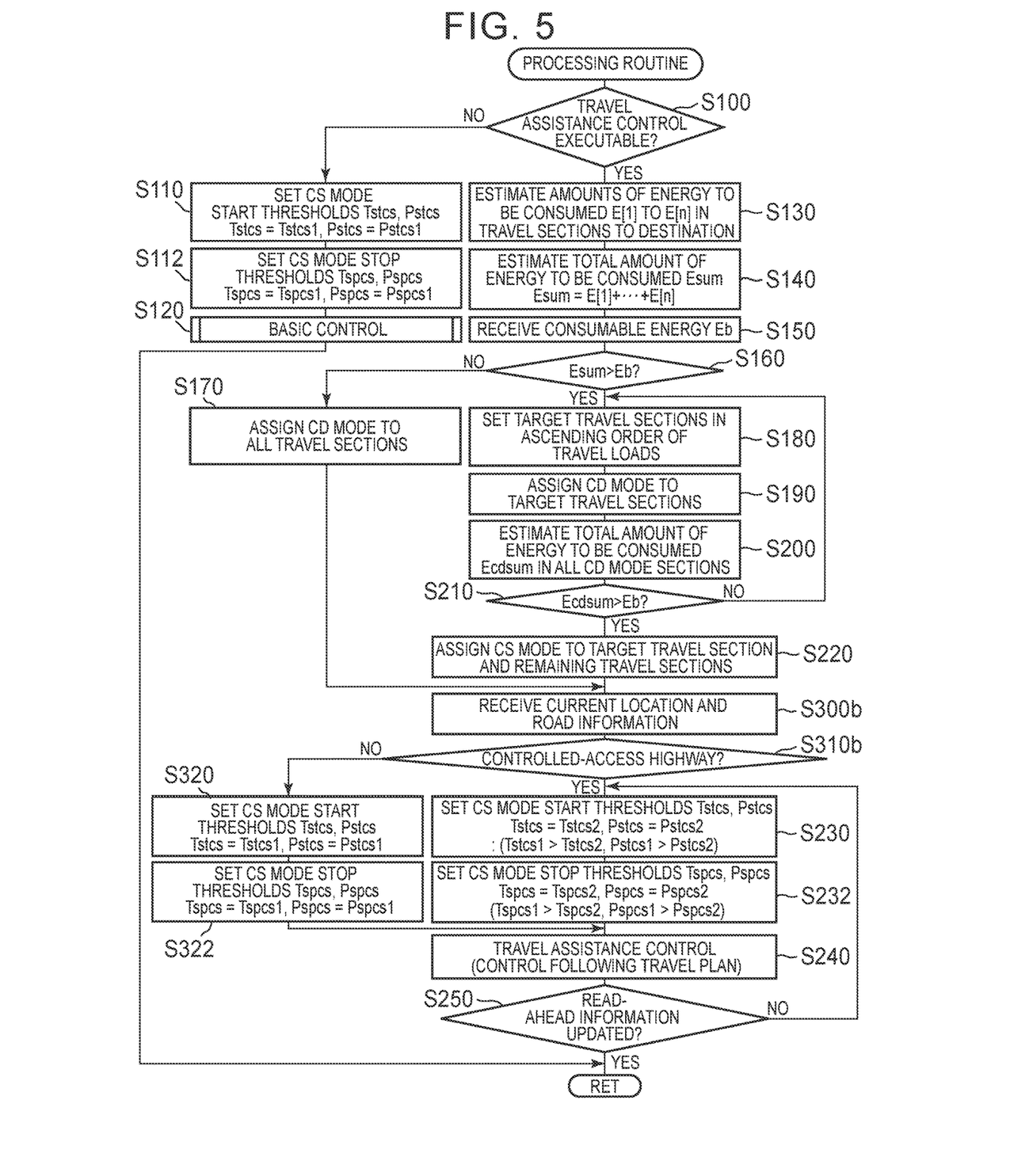
FIG. 5 is a flowchart of an example of a processing routine in yet another modified example.

Initially, the processing routine in FIG. 5 will be described. The processing routine in FIG. 5 is the same as the processing routine in FIG. 4 except for a point that processing in steps S300b and S310b is executed instead of the processing in steps S300 and 310. Thus, the same processing in the processing routine in FIG. 5 as that in the processing routine in FIG. 4 will be denoted by the same step numbers, and the detailed description thereon will not be made.

In the processing routine in FIG. 5, once creating (updating) the travel plan to the destination by the processing in steps S130 to S220, the HVECU 70 receives the current location of the host vehicle and the road information via the communication with the navigation system 90 (step S300b), and determines whether the current location of the host vehicle is on the controlled-access highway on the basis of the received current location of the host vehicle and the received road information (step S310b). If the HVECU 70 determines that the current location of the host vehicle is on the controlled-access highway, the processing proceeds to above-described step S230. On the other hand, if the HVECU 70 determines that the current location of the host vehicle is not on the controlled-access highway (is on the public road), the processing proceeds to above-described step S320.

When the current location of the host vehicle is on the public road, it is considered that the travel load is low and there is a low possibility that the larger amount of the consumable energy Eb of the battery 50 than expected is consumed in the CS mode sections and the CD mode sections in comparison with the case where the current location of the host vehicle is on the controlled-access highway. Accordingly, in the case where the CS mode start thresholds Tstcs, Pstcs and the CS mode stop thresholds Tspcs, Pspcs are reduced to promote the HV travel in the CS mode sections, the amount of the consumable energy Eb of the battery 50 is likely to become large in the CS mode section, and thus there is a possibility that the large amount of the consumable energy Eb cannot sufficiently be consumed in the CD mode sections to the destination (the certain large amount of the consumable energy Eb remains on arrival at the destination). In view of such a circumstance, as in this modified example, it is considered to set the CS mode start thresholds Tstcs, Pstcs and the CS mode stop thresholds Tspcs, Pspcs in the travel assistance control to be equal to those in the basic control when the distance Ld to the destination is shorter than the threshold Ldref. In view of such a circumstance, as in this modified example, in the case where the current location of the host vehicle is not on the controlled-access highway when the travel assistance control is executed, it is considered to set the CS mode start thresholds Tstcs, Pstcs and the CS mode stop thresholds Tspcs, Pspcs to be equal to those in the basic control.

In the processing routine in FIG. 5, in the case where the current location of the host vehicle is not on the controlled-access highway (is on the public road) during the travel assistance control, the CS mode start thresholds Tstcs, Pstcs and the CS mode stop thresholds Tspcs, Pspcs are set to be the equal values to those in the basic control. However, in the case where the current location of the host vehicle is not on the controlled-access highway (is on the public road) but on a particular road such as an urban road, a narrow street, a prefectural road, or a national road during the travel assistance control, the CS mode start thresholds Tstcs, Pstcs and the CS mode stop thresholds Tspcs, Pspcs may be the equal values to those in the basic control.

Figure 6:
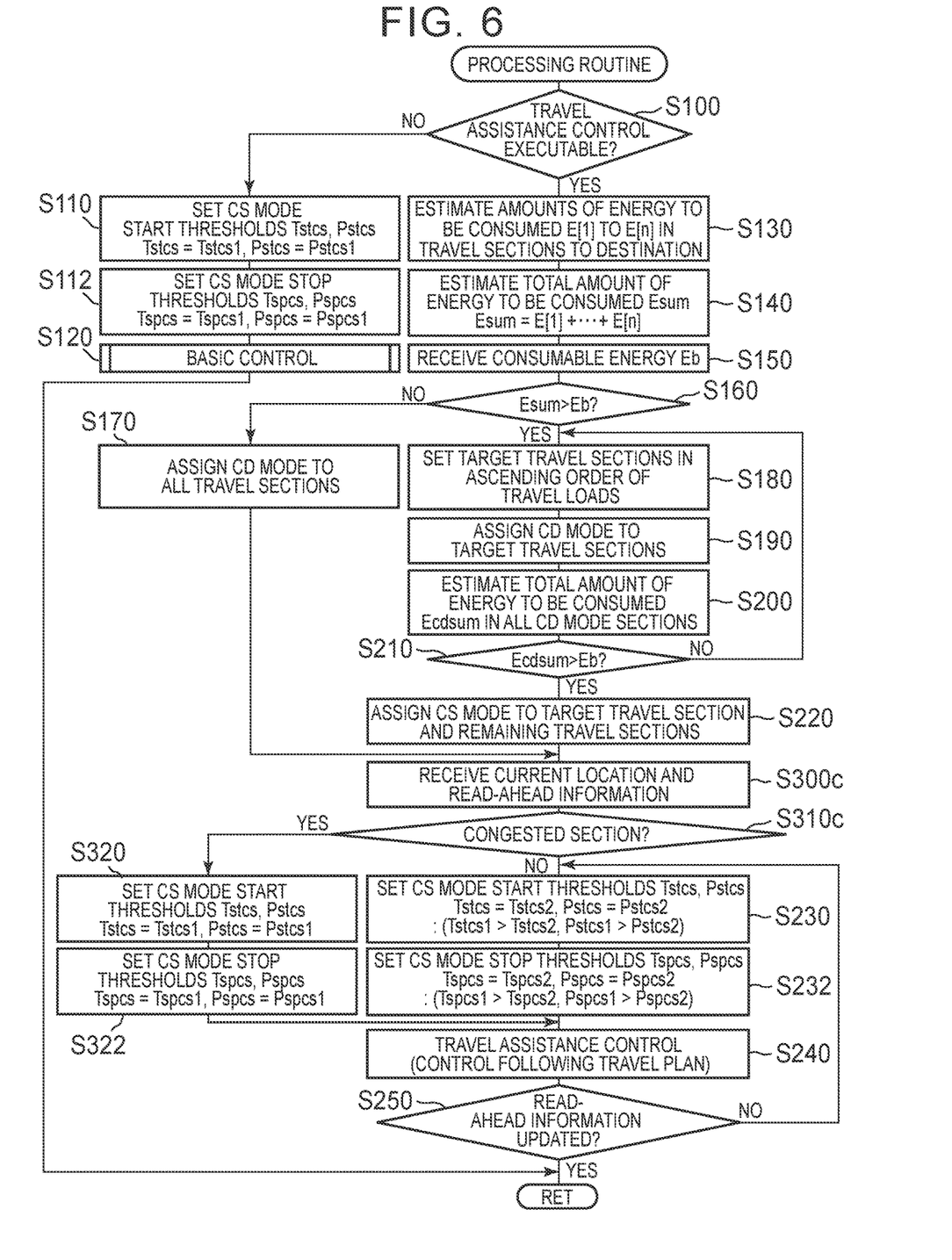
FIG. 6 is a flowchart of an example of a processing routine in further another modified example.

Next, the processing routine in FIG. 6 will be described. The processing routine in FIG. 6 is the same as the processing routine in FIG. 4 except for a point that processing in steps S300c and S310c is executed instead of the processing in steps S300 and 310. Thus, the same processing in the processing routine in FIG. 6 as that in the processing routine in FIG. 4 will be denoted by the same step numbers, and the detailed description thereon will not be made.

In the processing routine in FIG. 6, once creating (updating) the travel plan to the destination by the processing in steps S130 to S220, the HVECU 70 receives the current location of the host vehicle and the read-ahead information via the communication with the navigation system 90 (step S300c), and determines whether the current location of the host vehicle is in a congested section on the basis of the received current location of the host vehicle and the received read-ahead information (step S310c). Then, if the HVECU 70 determines that the current location of the host vehicle is not in the congested section, the processing proceeds to above-described step S230. On the other hand, if the HVECU 70 determines that the current location of the host vehicle is in the congested section, the processing proceeds to above-described step S320.

When the current location of the host vehicle is in the congested section, it is considered that the travel load is low and there is the low possibility that the larger amount of the consumable energy Eb of the battery 50 than expected is consumed in the CS mode sections and the CD mode sections. Accordingly, in the case where the CS mode start thresholds Tstcs, Pstcs and the CS mode stop thresholds Tspcs, Pspcs are reduced to promote the HV travel in the CS mode sections, the amount of the consumable energy Eb of the battery 50 is likely to become large in the CS mode section, and thus there is the possibility that the large amount of the consumable energy Eb cannot sufficiently be consumed in the CD mode sections to the destination (the certain large amount of the consumable energy Eb remains on arrival at the destination). In view of such a circumstance, as in this modified example, in the case where the current location of the host vehicle is in the congested section when the travel assistance control is executed, it is considered to set the CS mode start thresholds Tstcs, Pstcs and the CS mode stop thresholds Tspcs, Pspcs to be equal to those in the basic control.

In each of processing routines in FIG. 4 to FIG. 6, the CS mode start thresholds Tstcs, Pstcs and the CS mode stop thresholds Tspcs, Pspcs in the travel assistance control are changed on the basis of the distance Ld to the destination, whether the current location of the host vehicle is on the controlled-access highway, or whether the current location of the host vehicle is in the congested section. However, the CS mode start thresholds Tstcs, Pstcs and the CS mode stop thresholds Tspcs, Pspcs in the travel assistance control may be changed on the basis of at least two of the above. In such a case, the CS mode start thresholds Tstcs, Pstcs and the CS mode stop thresholds Tspcs, Pspcs in the travel assistance control may be changed (A) when the distance Ld to the destination is equal to or longer than the threshold Ldref, the current location of the host vehicle is on the controlled-access highway, and the current location of the host vehicle is not in the congested section or (B) when the distance Ld to the destination is shorter than the threshold Ldref, the current location of the host vehicle is not on the controlled-access highway, or the current location of the host vehicle is in the congested section. At the time of (A), the CS mode start thresholds Tstcs, Pstcs are set to the values Tstcs2, Pstcs2, and the CS mode stop thresholds Tspcs, Pspcs are set to the values Tspcs2, Pspsc2. At the time of (B), the CS mode start thresholds Tstcs, Pstcs are set to the basic values Tstcs1, Pspcs1, and the CS mode stop thresholds Tspcs, Pspcs are set to the basic values Tspcs1, Pspcs1.

As described above, in the processing routines in FIG. 4 to FIG. 6 and the modified examples of these, the CS mode start thresholds Tstcs, Pstcs and the CS mode stop thresholds Tspcs, Pspcs in the travel assistance control are changed on the basis of at least one of the distance Ld to the destination, whether the current location of the host vehicle is on the controlled-access highway, and whether the current location of the host vehicle is in the congested section. However, instead of the above, or in addition to the above, the target state of charge SOC*, the input limit Win, and the output limit Wout of the battery 50 in the travel assistance control may be changed on the basis of at least one of the distance Ld to the destination, whether the current location of the host vehicle is on the controlled-access highway, and whether the current location of the host vehicle is in the congested section.

In the hybrid vehicle 20 of the embodiment, the main body 92 of the navigation system 90 sets the travel plan route to the destination on the basis of the map information stored in the main body 92, the current location of the host vehicle, and the destination. However, in the case where the hybrid vehicle 20 can communicate with an external system (for example, a cloud server or the like), the external system may set the travel plan route to the destination on the basis of the map information provided in the external system and the current location and the destination from the hybrid vehicle 20, and may send the travel plan route to the destination to the hybrid vehicle 20.

In the hybrid vehicle 20 of the embodiment, the HVECU 70 creates (updates) the travel plan on the basis of the travel plan route to the destination. However, in the case where the hybrid vehicle 20 can communicate with the external system, the external system may create (update) the travel plan on the basis of the travel plan route to the destination, and may send the travel plan to the hybrid vehicle 20.

In the hybrid vehicle 20 of the embodiment, the battery 50 is used as the electric power storage device. However, a capacitor may be used instead of the battery 50.

The hybrid vehicle 20 of the embodiment includes the engine ECU 24, the motor ECU 40, the battery ECU 52, and the HVECU 70. However, at least two of these may be configured as single electronic control units.

Figure 7:
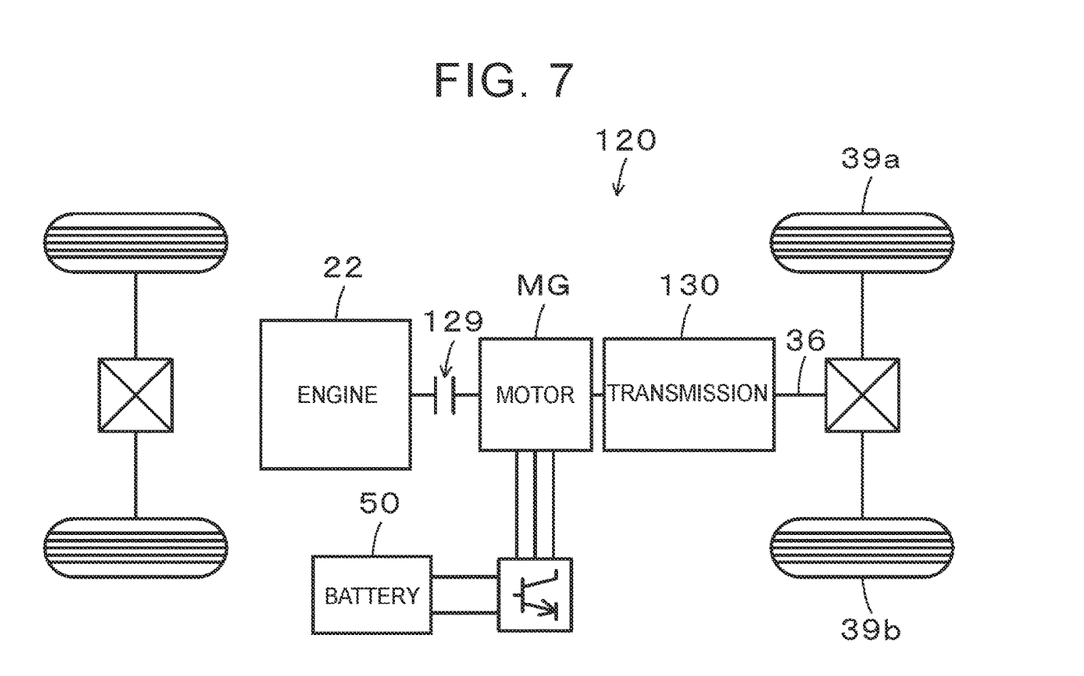
FIG. 7 is a configuration diagram that schematically shows a configuration of a hybrid vehicle 120 in even further another modified example.
Figure 8:
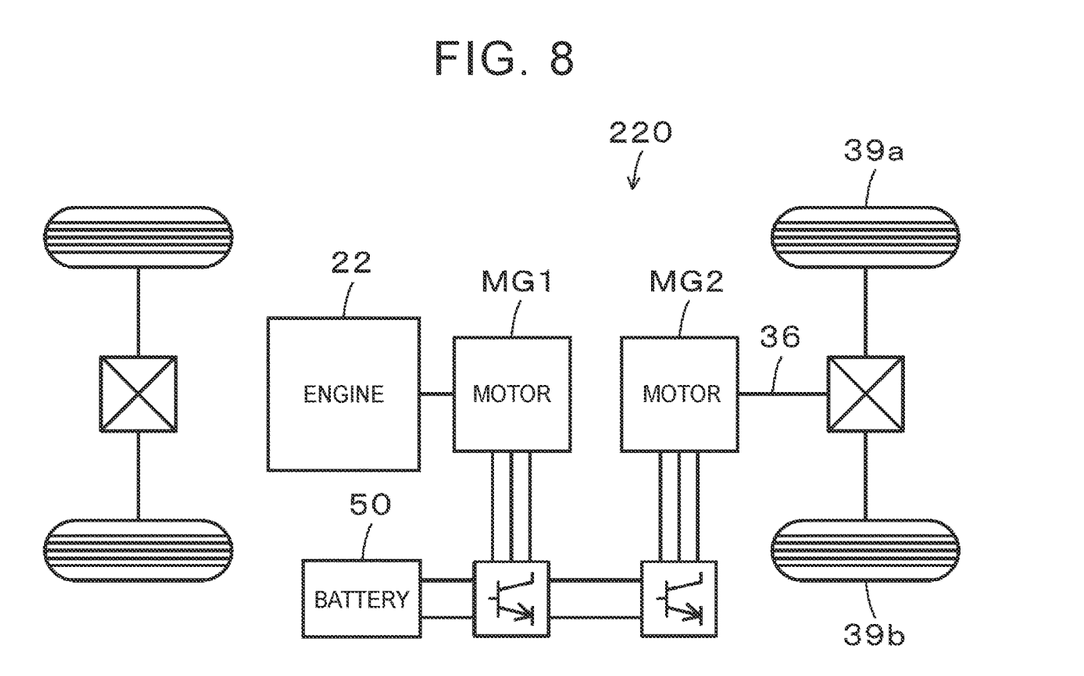
FIG. 8 is a configuration diagram that schematically shows a configuration of a hybrid vehicle 220 in even further another modified example.

The hybrid vehicle 20 of the embodiment is configured that the engine 22 and the motor MG1 are connected to the driveshaft 36, which is coupled to the drive wheels 39a, 39b, via the planetary gear 30, that the motor MG2 is connected to the driveshaft 36, and that the battery 50 is connected to the motors MG1 MG2 via the electric power lines 54. However, as shown in a hybrid vehicle 120 of a modified example in FIG. 7, a configuration of a so-called single-motor hybrid vehicle in which a motor MG is connected to the driveshaft 36, which is coupled to the drive wheels 39a, 39b, via a transmission 130, in which the engine 22 is connected to the motor MG via a clutch 129, and in which the battery 50 is connected to the motor MG via an electric power line may be adopted. Alternatively, as shown in a hybrid vehicle 220 of another modified example in FIG. 8, a configuration of a so-called series hybrid vehicle in which the generator-motor MG1 is connected to the engine 22, in which the travel motor MG2 is connected to the driveshaft 36, which is coupled to the drive wheels 39a, 39b, and in which the battery 50 is connected to the motors MG1, MG2 via electric power lines may be adopted.

In the embodiment, the engine 22 is an example of the "engine", each of the motors MG1, MG2 is an example of the "motor", the battery 50 is an example of the "electric power storage device", and the HVECU 70, the engine ECU 24, the motor ECU 40, and the navigation system 90 are an example of the "controller".

The mode for carrying out the disclosure has been described so far by using the embodiment. However, the disclosure is not limited to such an embodiment in any respect. Needless to say, the disclosure can be implemented in various modes within the scope that does not depart from the gist of the disclosure.

The disclosure can be used in a hybrid vehicle manufacturing industry and the like.

What is claimed is:
1. A hybrid vehicle comprising:
an engine;
a motor;

an electric power storage device configured to store electric power from the motor and supply electric power to the motor; and a controller configured to execute first control when a specified condition is not satisfied and to execute second control when the specified condition is satisfied, the specified condition including such a condition that a destination has been set, the first control being control of the engine and the motor such that the hybrid vehicle travels by switching between a charge depleting mode and a charge sustaining mode, and the second control being control of the engine and the motor such that the hybrid vehicle travels in accordance with a travel plan in which the charge depleting mode or the charge sustaining mode is assigned to each travel section of a travel plan route to the destination, wherein the controller is configured to control the engine and the motor such that a state of charge of the electric power storage device becomes higher in the charge sustaining mode in the second control than in the charge sustaining mode in the first control.

2. The hybrid vehicle according to claim 1, wherein
the controller is configured to set a start threshold of the engine to be lower in the charge sustaining mode in the second control than in the charge sustaining mode in the first control.

3. The hybrid vehicle according to claim 1, wherein
the controller is configured to set a stop threshold of the engine to be lower in the charge sustaining mode in the second control than in the charge sustaining mode in the first control.

4. The hybrid vehicle according to claim 1, wherein
in the charge sustaining mode in the second control, the controller executes at least one of increasing a target charged-discharged amount of the electric power storage device to a charged side, increasing allowable charge electric power of the electric power storage device, and reducing allowable discharge electric power of the electric power storage device in comparison with those in the charge sustaining mode in the first control.

5. The hybrid vehicle according to claim 1, wherein
the controller is configured to execute the same control as that in the charge sustaining mode in the first control in the case where a distance to the destination is shorter than a specified distance in the charge sustaining mode in the second control.

6. The hybrid vehicle according to claim 1, wherein
the controller is configured to execute the same control as that in the charge sustaining mode in the first control in the case where a current location is not on a controlled-access highway in the charge sustaining mode in the second control.

7. The hybrid vehicle according to claim 1, wherein
the controller is configured to execute the same control as that in the charge sustaining mode in the first control in the case where the current location is in a congested section in the charge sustaining mode in the second control.

* * * * *

UNITED STATES PATENT AND TRADEMARK OFFICE
CERTIFICATE OF CORRECTION

PATENT NO. : 10,654,466 B2
APPLICATION NO. : 16/273446
DATED : May 19, 2020
INVENTOR(S) : Yuki Ogawa It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

In the Specification

In Column 9, Line 32 & 33, delete "amounts of the amounts of the" and insert --amounts of the--, therefor.

In Column 10, Line 52, delete "Pspsc" and insert --Pspcs--, therefor.

In Column 13, Line 15, delete "Pspsc" and insert --Pspcs--, therefor

In Column 15, Line 48, delete "Pspsc" and insert --Pspcs--, therefor

In Column 16, Line 33, delete "MG1 MG2" and insert --MG1, MG2--, therefor.

Signed and Sealed this
Fourteenth Day of July, 2020

Andrei Iancu
*Director of the United States Patent and Trademark Office*